May 23, 1961  R. STAHL  2,985,415
SUPPORT FOR CAMERAS AND THE LIKE
Filed Oct. 21, 1958
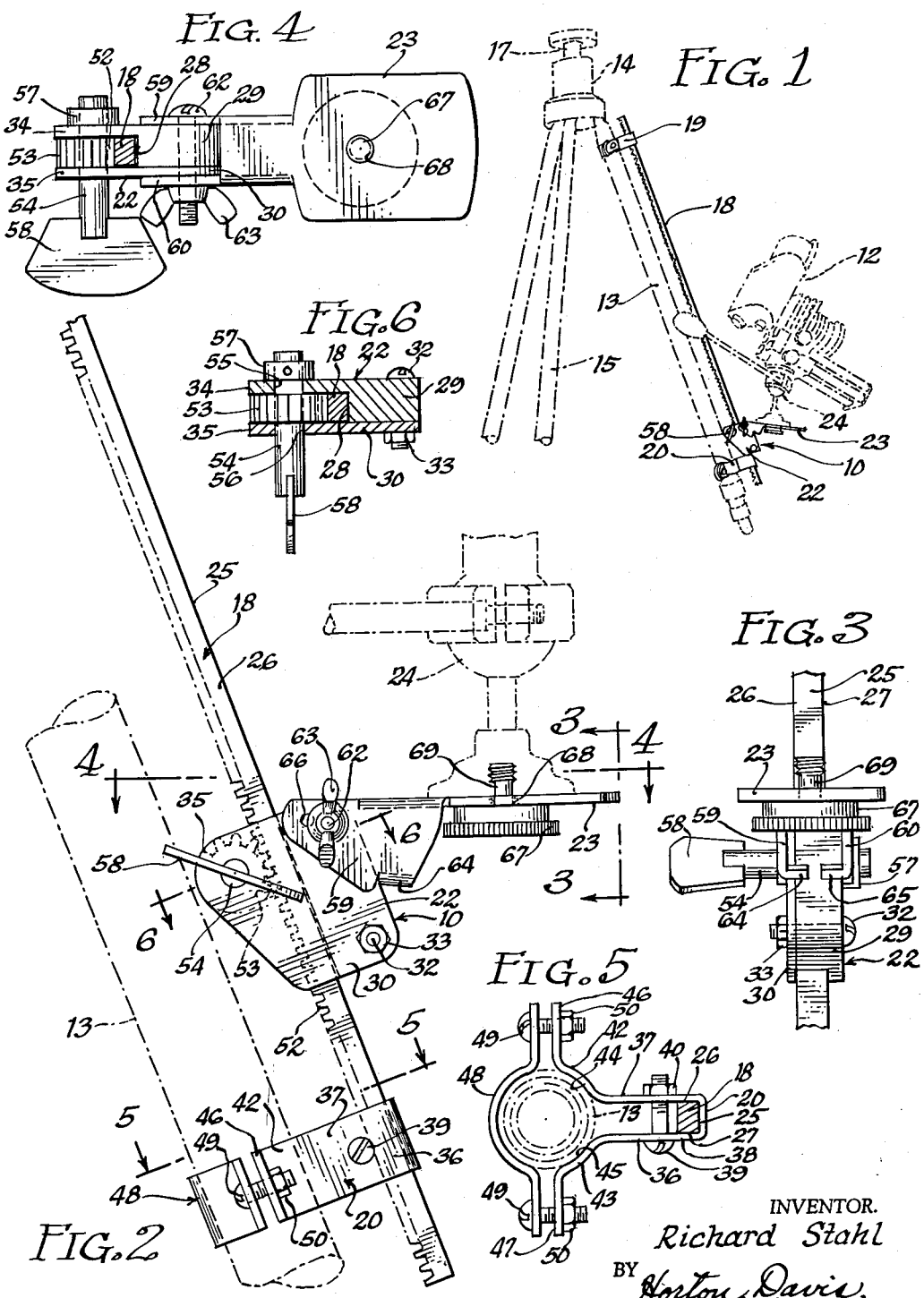
INVENTOR.
Richard Stahl
BY Horton, Davis,
Brewer & Brugman
Attorneys

United States Patent Office 2,985,415
Patented May 23, 1961

2,985,415
SUPPORT FOR CAMERAS AND THE LIKE
Richard Stahl, 12049 S. Stewart Ave., Chicago, Ill.
Filed Oct. 21, 1958, Ser. No. 769,056
5 Claims. (Cl. 248—122)

This invention relates to a support for cameras and the like, and more particularly to a support structure adapted to use with another supporting element, such as a tripod, for achieving a range of positions or levels beyond the scope of those readily reached with customary basic supporting elements.

Tripod types of instrument supports for cameras and the like are available at present in various sizes and weights and afford varying degrees of instrument stability and various ranges of positions to which an instrument can be adjusted for support when mounted thereon. Ordinarily stability of support requires reasonable size and weight. Also, when size is increased in a tripod support in order to obtain reasonable stability at heights often desired, the minimum height limit and the usable instrument positions are not suitable to the user.

Photographers, for example, when away from home or the studio, often require not only the stability of the support of a stable tripod for their work and the limitation of the burden of carrying a variety of supporting equipment in addition to other essentials, but they may well need a range of variation in instrument levels and positions which is beyond that readily available with presently known tripods.

As a specific example, a photographer on a field trip in search of nature subjects will not want to be unduly burdened, but may want to photograph subjects ranging in height from fruit, a blossom or a bird or animal in a tree to a flower, a mushroom or some other object on the ground. The desire for stable camera support is the same in either instance, but the desired camera positions are far different.

One of the objects of this invention is to provide an auxiliary attachment for use with a basic supporting element, such as a tripod, and which affords a stable support for a camera or the like at a range of levels and positions not readily reached with the basic supporting element.

Another object of my invention is to provide an auxiliary attachment for photographic tripods and the like which increases the camera supporting range of the tripod with which it is used and which may be left on the tripod without material inconvenience to the user.

My invention has for another object the provision of an auxiliary camera support for use on the heavier and more stable types and sizes of photographic tripods and which very materially increases the range of camera supporting positions available with the tripod without losing the stability which is inherent in the tripod.

As another object, the invention has within its purview the provision of an auxiliary instrument support for tripods which is attachable to and movable along one leg of the tripod for achieving a range of instrument positions and levels below the top part of the tripod, at which the instrument is usually attached.

This invention further comprehends the provision of an auxiliary instrument support for use on tripods and the like which affords a smoothly and easily variable range of instrument support and which is readily attachable to standard tripods and other supports of various sizes.

It is further within the purview of my invention to provide means for supporting an instrument, such as a camera, for movement to selected positions along a leg of a support, such as a tripod, and which has an inherent self-locking or holding action for at least initially and normally retaining the selected position to which the instrument is adjusted.

Other objects, features and advantages of my invention will appear from the following description wherein reference is made to the accompanying drawings in which:

Fig. 1 is a fragmentary perspective view depicting an adaptation of a preferred embodiment of my auxiliary support structure to the support of a camera relative to a tripod, the camera and tripod being shown in dot-and-dash lines, since they do not comprise parts of the auxiliary support, as such;

Fig. 2 is a fragmentary side elevational view of a portion of the structure depicted in Fig. 1, and drawn to a larger scale than Fig. 1 to illustrate details of the structure;

Fig. 3 is a fragmentary front elevational view of a portion of the structure illustrated in Fig. 2, and wherein the view is taken substantially as indicated by a line 3—3 and accompanying arrows in Fig. 2;

Fig. 4 is a top sectional view taken substantially as indicated by a line 4—4 and accompanying arrows in Fig. 2.

Fig. 5 is a top sectional view taken substantially on a line 5—5 of Fig. 2 and in the direction of the accompanying arrows; and Fig. 6 is also a top sectional view taken substantially at the position indicated by a line 6—6 and in the direction of the accompanying arrows in Fig. 2.

In the exemplary embodiment of my invention which is shown in the accompanying drawings for illustrative purposes, my auxiliary support structure is indicated generally by reference numeral 10 and is shown in an adaptation to the support of a camera 12 relative to a leg 13 of a tripod 14. As is usual, the illustrated tripod has additional supporting legs 15 and 16 and a head portion 17, which head portion provides the support upon which a camera or other instrument is usually mounted. When the head portion of the tripod is utilized for carrying the camera or other instrument, in the usual manner, the minimum height to which the camera or instrument can be supported is dependent upon the height of the head portion and the minimum lengths to which the legs can be collapsed.

Considered generally, the auxiliary support 10 which is herein depicted includes a slide bar or guide 18 securable to a support, such as the leg 13 of a tripod, by brackets 19 and 20 near the opposite ends of the slide bar and which supports the slide bar relative to the tripod leg in spaced and substantially parallel relationship thereto. A slide 22 is mounted on the slide bar for movement therealong and has thereon an instrument supporting bracket 23 normally projecting away from the slide bar and the tripod leg.

In the illustrative adaptation which is shown herein, the camera 12 is supported from the instrument supporting bracket 23 on the auxiliary support structure 10 through a ball-type swivel head 24 of a type often used to afford relatively universal rotation and swivel movements of the camera relative to a support. It may be understood, of course, that the camera may be mounted directly upon the instrument supporting bracket 23, if desired, without utilizing the illustrated swivel head.

Considered in greater detail, the slide bar or guide 18, in the illustrated structure, is of substantially rectangular section and is of sufficient sectional weight compared to its length to afford a relatively rigid structural support, particularly when supported at its opposite ends by means such as the brackets 19 and 20. The illustrated slide bar or guide 18 has a flat and longitudinally straight outer or front surface 25 and substantially flat and longitudinally straight side surfaces 26 and 27. The slide 22 has a longitudinal recess 28 extending the full length thereof into which recess the slide bar or guide fits for sliding movement of the slide along the slide bar to selected positions. In the disclosed structure, the recess 28 is provided by a milled block 29 and a plate 30 which is secured to one side of the block by fastening means such as a machine screw 32 and a nut 33. The milled block 29 and the plate 30 provide wing portions 34 and 35 in spaced and opposed relationship to one another which straddle the side surfaces 26 and 27 of the slide bar, so that the slide has three flat surfaces engaging the flat and relatively straight surfaces of the slide bar, thereby affording a movable supporting element which is slidable longitudinally along the slide bar, while being nonrotatable relative thereto.

In the structure depicted, the brackets 19 and 20 are alike and each supports the slide bar in spaced relationship to the tripod leg. As shown, each bracket has a substantially U-shaped leg portion 36 including side portions 37 and 38 between which the slide bar 18 is gripped at an adjusted and fixed position by the tightening of a fastening element such as a screw 39 and an associated nut 40, which screw extends through the sides of the U-shaped leg portion 36 adjacent the slide bar. Angularly disposed extensions 42 and 43 on the sides 37 and 38 respectively of the U-shaped leg portion 36 provide seating surfaces 44 and 45 for engaging circumferentially spaced portions of the outer surface of the tripod leg 13 and have extensions 46 and 47 thereon to which a clamping strap 48 is removably secured at its opposite ends by fastening means such as screws 49 and nuts 50 threaded onto the screws. Thus, by loosening and tightening the screw 39 the positions of the brackets may be adjusted along the slide bar 18 so that it can be adapted in its effective length to the length of the support or tripod leg with which it is to be used, and the brackets can be readily secured to tripod legs and the like of different sizes and lengths.

In the illustrated structure, the slide bar comprises a rack having teeth 52 along the surface thereof which faces toward the supporting structure. Cooperating with the teeth 52 of the rack on the slide bar 18 is a pinion gear 53 mounted in the recess 28 between the wing portions 34 and 35 of the slide 22 and carried by a shaft 54 which is journaled for rotation in aligned bores 55 and 56 in the wing portions 34 and 35. A collar 57 is secured to one end of the shaft 54, and a wing-type grip 58 is secured to the other end of the shaft to facilitate manual movement of the pinion for effecting movements of the slide 22 to selected positions along the slide bar.

The instrument supporting bracket 23 is mounted at the top portion of the slide 22 and has integral side flanges 59 and 60 which embrace the outer side surfaces of the slide and are secured in place relative thereto by fastening means, such as a screw 62 which extends through the side flanges and the slide and is desirably provided with a wing nut 63, so that the bracket may be clamped in a position relative to the slide, and also so that the gripping action of the slide against the sides of the slide bar can be relieved for moving the slide along the slide bar or tightened to hold the slide in a fixed position relative to the slide bar.

When the bracket 23 is in a position projecting outwardly from the slide 22 and away from the slide bar 18, integral lugs 64 and 65 on the lower end portions of the flanges 59 and 60 engage the outer surface of the slide 22 to limit the movement of the bracket in one direction relative to the slide. It may be readily understood that when the bracket 23 is not in use for supporting an instrument, such as a camera, it may be folded to an out-of-the-way position in which it extends upwardly along the slide bar 18, and the tripod or support may be utilized in its usual manner without removing the entire auxiliary support therefrom.

Since tripods of different makes may have different normal leg angles when set up for use, additional holes such as 66 may be provided in the flanges 59 and 60 on the bracket 23, so that the fastening means, such as the screws 62, may be moved to holes in the bracket which afford practically horizontal disposition of the bracket when the lugs 64 and 65 engage the slide. In the bracket illustrated, a thumb screw 67 is provided for securing an instrument, such as a camera, or the swivel head 24 to the bracket. In the form depicted the thumb screw 67 is threaded through an opening 68 in the bracket and has an undercut portion 69 between the threaded end portion of the screw and the head thereof which permits free rotation of the screw within the threaded opening for tightening the camera or swivel head thereon, while the threads prevent the screw from falling from the opening when it is not in use.

In the disclosed structure, the pinion gear 53 is located near the top of the slide 22 and is on one side of the slide bar 18, while the bracket 23 is also mounted at the top of the slide and projects from the side of the slide bar opposite that on which the pinion gear is mounted. Furthermore, the lugs 64 and 65 on the side flanges 59 and 60 of the bracket limit downward movement of the bracket relative to the slide, as would normally be effected by weight or force applied downwardly against the projecting portion of the bracket. It may be realized that the leverage of the bracket, as it projects from the slide, has a tendency to turn the slide relative to the slide bar in a direction which draws the teeth of the pinion gear 53 toward and into the teeth 52 on the slide bar rack.

Thus, while the slide is readily movable along the slide bar by rotation of the pinion gear, or even by manual force applied to the slide 22 in a desired direction parallel to the slide bar, the weight or force applied downwardly against the bracket at a position outwardly from the slide tends to turn the slide in a direction to tighten the engagement of the pinion gear with the rack teeth to tighten or bind the slide against downward movement as a result of that force against the bracket.

From the foregoing description and reference to the accompanying drawings, it may be readily understood that I have provided an auxiliary support which, in addition to being readily attachable to a main support, such as a tripod leg, materially extends the range of supporting positions that can be reached by an instrument supported thereby and with the tripod, and also, by virtue of its inherent rigidity and the fact that it is anchored to the support or tripod at a plurality of positions and reenforced thereby, establishes an instrument support which need not necessarily be removed from the tripod when not in use, but which provides a firm and readily adjustable support during use.

It is understood that the foregoing description is merely illustrative of a preferred embodiment of the invention and that the scope of the invention is not to be limited thereto but is to be determined by the appended claims.

I claim:

1. An auxiliary instrument support for attachment to a leg of a tripod and comprising, in combination, a slide bar of polygonal section having substantially straight longitudinal surfaces in angular relationship to one another and teeth providing a rack extending along another surface thereof, brackets located at opposite end portions of the slide bar and each having tripod leg and slide bar engaging clamp means at opposite ends thereof with intervening arm portions between said opposite ends for holding the slide bar in fixed and spaced relationship relative to the tripod leg with said rack facing toward the tripod leg, a slide having opposed side surfaces straddling and slidably mounted on two of said substantially straight longitudinal surfaces of the slide bar and extending across opposite sides of the rack, a pinion having teeth engaging said rack, means supporting the pinion between said opposed side surfaces of the slide for rotational movements about a fixed axis, an instrument support bracket having instrument supporting and integrally formed stop surfaces in angular relationship to one another, means supporting said instrument support bracket for swinging movements relative to the slide about an axis having a level above and on the opposite side of the slide bar from the axis of rotational movement of the pinion, said stop surface of the instrument supporting bracket being positioned to engage the slide below the axis of rotational movement of the pinion when said instrument supporting surface extends away from the slide on the side of the slide bar opposite the pinion.

2. An auxiliary instrument support as defined in claim 1, and wherein said instrument support bracket has integral side flanges thereon which overlie opposed surfaces of the slide, and said stop surfaces are provided by integral extensions of said side flanges which extend therefrom in angular relationship thereto.

3. An auxiliary instrument support as defined in claim 1, and wherein said slide has a length such that it extends along the slide bar to a position below that engaged by the stop surface.

4. An auxiliary instrument support for attachment to a leg of a tripod and comprising, in combination, a slide bar having teeth thereon providing a rack extending along one side thereof, support brackets at opposite ends of the slide bar and extending therefrom in angular relationship to the rack for supporting the slide bar with the rack facing toward the tripod leg, a slide having side portions and an intermediate portion defining an open slot along one side thereof and having surfaces fitting slidably onto the slide bar with said side portions extending across opposite sides of the rack, a pinion having teeth, means supporting the pinion between said side portions of the slide for rotation about an axis near the upper end of the slide and with the teeth thereof engaging the teeth of the rack, an instrument support bracket having instrument supporting and stop surfaces in spaced and angular relationship to one another, said instrument support bracket having side flanges in spaced and opposed relationship to one another and extending angularly from said instrument supporting surface, said instrument support bracket being mounted on said slide with said side flanges overlying opposite side surfaces thereof with said instrument supporting surface extending away from the slide bar on the side thereof opposite said rack, means supporting said instrument support bracket relative to said slide for swinging movements about an axis near the top of the slide and on the side of the slide bar opposite the axis of rotation of said pinion, and said stop surface on the instrument support bracket engaging the slide below the axis of the pinion when the instrument supporting surface extends outwardly from the slide.

5. In an auxiliary instrument support for attachment to a leg of a tripod, the combination comprising a slide bar, a slide having side portions and an intermediate portion defining a slot at one side thereof and having surfaces fitting slidably onto the slide bar with the side portions of the slide extending across the slide bar, means supported between the side portions of the slide for rotation about a rotational axis at the top of the slide and substantially perpendicular to said side portions, said means having rolling contact with the slide bar, an instrument support bracket having instrument supporting and stop surfaces in spaced and angular relationship to one another, said instrument support bracket having side flanges overlying opposite side surfaces of the slide and secured to the slide for upward swinging movement about a second axis from a position in which said instrument supporting surface projects outwardly from the side of the slide bar opposite said means and said stop surface engages the slide below said rotational axis and said second axis so that force applied downwardly against the instrument supporting surface tends to move said means toward one side of the slide bar and to move the bottom of the slide toward the side of the slide bar opposite that engaged by said means.

References Cited in the file of this patent

UNITED STATES PATENTS

| | | |
|---|---|---|
| 284,090 | Tingle | Aug. 28, 1883 |
| 621,856 | Schwarz | Mar. 28, 1899 |
| 831,103 | Ripperger | Sept. 18, 1906 |
| 1,358,277 | Bochard | Nov. 9, 1920 |
| 1,544,881 | Bean | July 7, 1925 |
| 2,862,683 | Dunagan | Dec. 2, 1958 |